United States Patent Office 3,471,470
Patented Oct. 7, 1969

3,471,470
NOVEL DERIVATIVES OF DESGLUCOHELLEBRIN
Joachim Heider, Warthausen-Oberhofen, and Hans Machleidt, Biberach an der Riss, Germany, and Walter Kobinger, Vienna, Austria, assignors to Boehringer Ingelheim G.m.b.H., Ingleheim am Rhein, Germany, a corporation of Germany
No Drawing. Filed Dec. 14, 1966, Ser. No. 601,569
Claims priority, application Germany, Dec. 17, 1965, T 30,058, T 30,059
Int. Cl. C07c 173/00
U.S. Cl. 260—210.5                         8 Claims

ABSTRACT OF THE DISCLOSURE

The compounds are substitution products of bufa-20, 22-dienolide, useful as cardiac-active glucoside principles in warm-blooded animals.

---

This invention relates to novel derivatives of desglucohellebrin, as well as to various methods of preparing these compounds.

More particularly, the present invention relates to novel bufa-20,22-dienolide substitution products of the formula

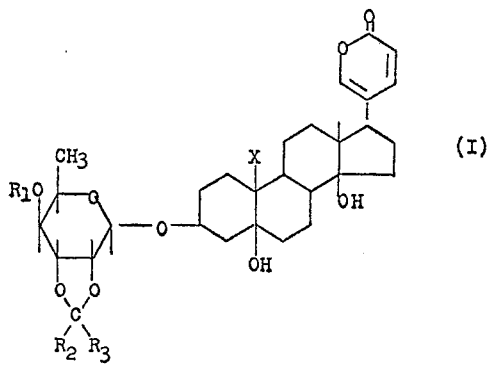

wherein:
$R_1$ is hydrogen or acetyl,
$R_2$ and $R_3$, which may be identical to or different from each other, are hydrogen, alkyl, haloalkyl or, together with each other and the carbon atom to which they are attached, an alicyclic ring of 5 to 7 carbon atoms, and
X is formyl or hydroxymethyl.

The compounds according to the present invention may be prepared by the following methods:

METHOD A

By reacting a compound of the formula

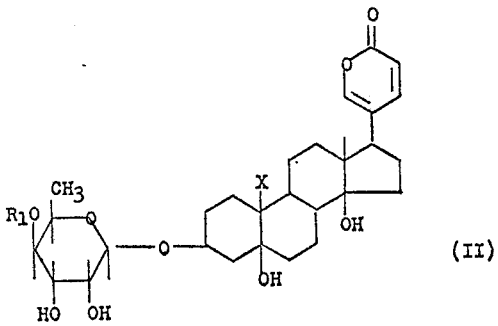

wherein $R_1$ and X have the same meanings as in Formula I, with a compound of the formula

wherein $R_2$ and $R_3$ have the same meanings as in Formula I, whereby the two cis-hydroxyl groups of the rhamnose moiety are acetalized or ketalized.

The reaction between compounds II and III is advantageously carried out at room temperature or moderately elevated temperatures, preferably at a temperature between 20 and 30° C., in the presence of a dehydrating agent. The reaction may, if desired, be performed in the presence of an inert organic solvent, such as an aromatic hydrocarbon or a chlorinated hydrocarbon; it is preferred, however, to proceed without the use of a solvent and instead provide an excess of compound III over and above the stoichiometric amount required for complete reaction with compound II.

Examples of suitable compounds of the Formula III are aldehydes and ketones, such as propionaldehyde, chloral, acetone and cyclohexanone.

The preferred dehydrating agent is anhdyrous copper sulfate; however, other dehydrating agents, such as hydrochloric acid and p-toluenesulfonic acid, may also be used.

METHOD B

For the preparation of a compound of the Formula I wherein X is hydroxymethyl, by reducing a compound, obtained pursuant to method A, of the formula

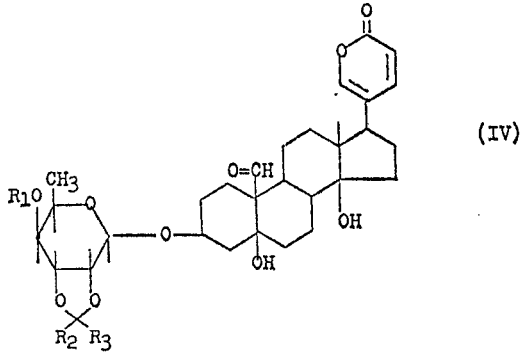

wherein $R_1$, $R_2$ and $R_3$ have the same meanings as in Formula I, with lithium-tri-tert.butoxy-aluminum hydride.

The reduction is preferably carried out at a temperature between 0 and 25° C. in the presence of an inert organic solvent, such as tetrahydrofuran, ether or dioxane.

METHOD C

For the preparation of compounds of the Formula I wherein $R_1$ is acetyl, by acetylating a compound of the Formula I wherein $R_1$ is hydrogen. The acetylation is carried out pursuant to customary procedures, that is, with a reactive derivative of acetic acid, such as an acetyl halide, acetic acid anhydride or a mixed anhydride of acetic acid and a carbonic acid monoester, at room temperature in the presence of an inert solvent and of an acid-binding agent, i.e. an agent capable of tying up or neutralizing the acid released by the acetylation reaction. Examples of suitable acid-binding agents are inorganic bases or tertiary organic bases. The latter, especially pyridine, may simultaneously serve as the solvent medium for the reaction if they are provided in substantial excess over and above the stoichiometric amount.

A starting compound of the Formula II wherein X is hydroxymethyl is obtained by reducing desglucohellebrin with lithium-tri-tert.butoxy-aluminum hydride at a temperature between 0 and 25° C. in the presence of an inert organic solvent, such as tetrahydrofuran, ether or dioxane.

Desglucohellebrin may be obtained by treating an aqueous solution of hellebrin containing a small amount of toluene at 37° C. with strophanthobiase, whereby the glucose moiety is split off from the hellebrin molecule [see Swiss Patent No. 257,246 and J. Schmutz, Pharm. Acta Helv. 22, 373 (1947)]. Strophanthobiase is isolated from the seed *Strophanthus kombé*. The isolation of hellebrin from the roots of the Christmas rose (radix *Helleborus niger* L.) is described in German Patent No. 605,073 and Helv. Chim. Acta 26, 1353 (1943).

The following examples further illustrate the present invention and will enable others skilled in the art to understand it more completely. It should be understood, however, that the instant invention is not limited to the particular examples given below.

Example 1.—Preparation of 3β-(2′,3′-isopropylidene)-L-rhamnosido - 5β,14β - dihydroxy - 19 - oxo-bufa-20,22-dienolide by method A A mixture of 2.5 gm. of desglucohellebrin, 400 cc. of anhydrous acetone and 15 gm. of anhydrous copper sulfate was shaken at room temperature for 3 to 4 days. The progress of the reaction was followed by means of periodic thin-layer-chromatography of a sample of the reaction mixture. After the reaction had gone to completion, the copper sulfate was separated by vacuum filtration, and the filtrate was concentrated to a smaller volume. The concentrated solution was then passed through an aluminum oxide column (20 gm. of $Al_2O_3$, activity stage I according to Woelm), evaporated to dryness, and the residue was recrystallized from a 4:3 mixture of acetone and ether. 2.1 gm. (78% of theory) of a substance in the form of crystalline leaflets, M.P. 229–231° C., were obtained. It was identified to be 3β-(2′,3′-isopropylidene)-L-rhamnosido-5β,14β-dihydroxy-19-oxo-bufa-20,22-dienolide of the formula

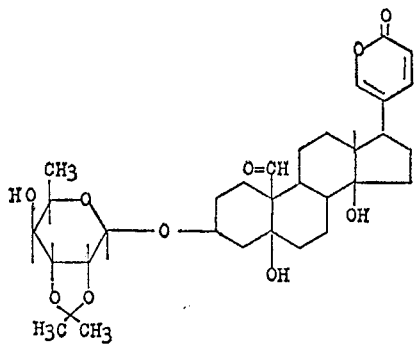

Example 2.—Preparation of 3β-(2′,3′-isopropylidene-4′-acetyl) - L - rhamnosido - 5β,14β - dihydroxy - 19 - oxo-bufa-20,22-dienolide by method C 4.7 gm. of desglucohellebrin acetonide were dissolved in 30 cc. of pyridine, 20 cc. of acetic acid anhydride were added thereto, and the mixture was allowed to stand for 43 hours at 20° C. Thereafter, the reaction solution was evaporated to dryness in vacuo, the residue was dissolved in chloroform, and the solution was washed first with water, then with 2 N hydrochloric acid, then again with water, then with an aqueous 2 N sodium carbonate solution, and finally again with water. The solution was subsequently dried over sodium sulfate and again evaporated to dryness in vacuo. The residue was taken up in 25 cc. of acetone, and the solution was admixed with petroleum ether until crystallization began. 4.17 gm. (83% of theory) of a crystalline substance in the form of leaflets, M.P. 229–231° C., were obtained. It was identified to be 3β-(2′,3′-isopropylidene - 4′ - acetyl) - L - rhamnosido-5β,14β-dihydroxy-19-oxo-bufa-20,22-dienolide of the formula

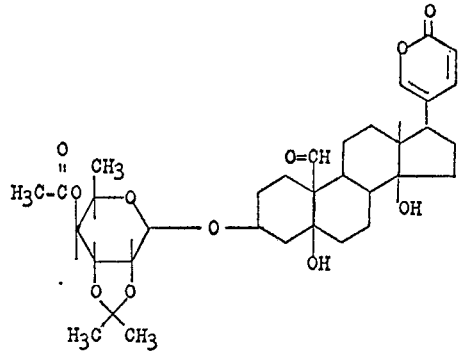

Example 3.—Preparation of 3β-(2′,3′-cyclohexylidene)-L-rhamnosido - 5β,14β - dihydroxy - 19 - oxo-bufa-20,22-dienolide by method A A mixture of 0.25 gm. of desglucohellebrin, 30 cc. of dry cyclohexanone and 1.5 gm. of anhydrous copper sulfate was shaken for five days at room temperature. Thereafter, the copper sulfate was removed by vacuum filtration, the filtrate was evaporated to dryness, the residue was dissolved in a small amount of acetone, and the solution was admixed with ether until crystallization began. 138 mgm. (49% of theory) of a substance having a melting point of 130–135° C. were obtained. It was identified to be 3β-(2′,3′-cyclohexylidene)-L-rhamnosido-5β,14β-dihydroxy-19-oxo-bufa-20,22-dienolide of the formula

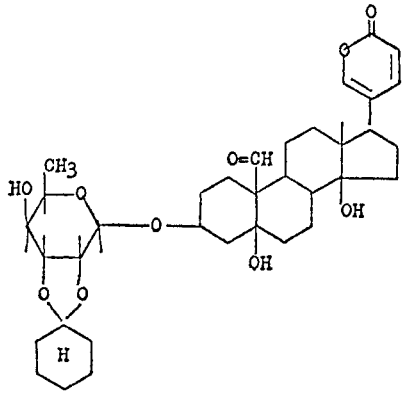

Example 4.—Preparation of 3β-(2′,3′-n-propylidene)-L-rhamnosido - 5β,14β - dihydroxy - 19 - oxo - bufa-20,22-dienolide by method A 0.25 gm. of desglucohellebrin was combined with 50 cc. of propionaldehyde and 2 gm. of anhydrous copper sulfate, and the mixture was shaken for three days at room temperature. Thereafter, the reaction mixture was worked up as described in Example 1. 162 mgm. (59% of theory) of a white substance, M.P. 135–138° C. (decomp.), were obtained. It was identified to be 3β-(2′,3′-n - propylidene) - L - rhamnosido - 5β,14β - dihydroxy-19-oxo-bufa-20,22 - dienolide of the formula

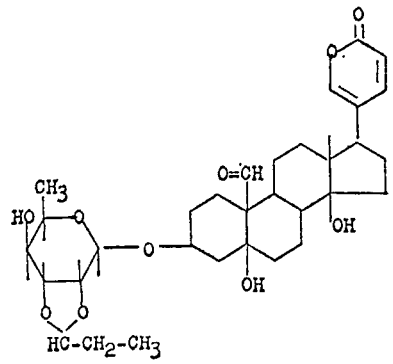

Example 5.—Preparation of 3β-(2′,3′-n-propylidene-4′-acetyl) - L - rhamnosido - 5β,14β - dihydroxy - 19-oxo-bufa-20,22-dienolide by method C 100 mgm. of 3β-(2′,3′-n-propylidene)-L-rhamnosido-5β,14β - dihydroxy - 19 - oxo - bufa - 20,22 - dienolide were dissolved in 0.5 cc. of pyridine, the solution was admixed with 0.1 cc. of acetic acid anhydride, and the mixture was allowed to stand for 48 hours at 0° C. Thereafter, the reaction solution was evaporated to dryness, the residue was taken up in chloroform, the chlorofrom solution was washed with water, dried and evaporated to dryness, and the residue was recrystallized from a mixture of acetone and ether. 82 mgm. (75% of theory) of a substance having a melting point of 253–260° C. were obtained. It was identified to be 3β-(2′,3′-n-propylidene-4′ - acetyl) - L - rhamnosido - 5β,14β - dihydroxy - 19-oxo-bufa-20,22-dienolide.

Example 6

Using a procedure analogous to that described in Example 1, 3β-(2′,3′-ethylidene)-L-rhamnosido-5β,14β-dihydroxy-19-oxo-bufa-20,22-dienolide, a white substance having a melting point of 187–190° C., was prepared from 250 mgm. of desglucohellebrin, 1 gm. of anhydrous copper sulfate, 12.5 gm. of acetaldehyde and 25 cc. of benzene. The yield was 60 mgm.

Example 7

Using a procedure analogous to that described in Example 1, 3β-(2′,3′-trichloroethylidene)-L-rhamnosido-5β,14β-dihydroxy-19-oxo-bufa-20,22-dienolide, light yellow needles having a melting point of 134–138° C., of the formula

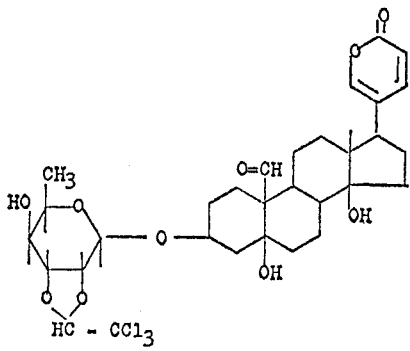

was prepared from 500 mgm. of desglucohellebrin, 2.5 gm. of anhydrous copper sulfate, 25 cc. of chloral and 50 cc. of benzene. The yield was 201 mgm.

Example 8.—Preparation of 3β-(2′,3′-isopropylidene)-L-rhamnosido - 5β,14β,19 - trihydroxy - bufa - 20,22-dienolide by method B A solution of 0.6 gm. of desglucohellebrin acetonide in 10 cc. of dry tetrahydrofuran was admixed with 25 cc. of a reducing solution consisting essentially of lithium-tri-tert.butoxy-aluminum hydride dissolved in tetrahydrofuran, and the mixed solution was allowed to stand for one hour at 0° C. Thereafter, 10 cc. of aqueous 5% acetic acid were added, and then the mixture was extracted with chloroform. The chloroform extract solution was washed first with a saturated aqueous sodium bicarbonate solution and then with water, evaporated to dryness in vacuo, and the residue was recrystallized from 1:1 mixture of methanol and ether. 0.52 gm. (86% of theory) of a substance having a melting point of 233–235° C. was obtained. It was identified to be 3β-(2′,3′-isopropylidene) - L - rhamnosido - 5β,14β,19-trihydroxy-bufa-20,22-dienolide of the formula

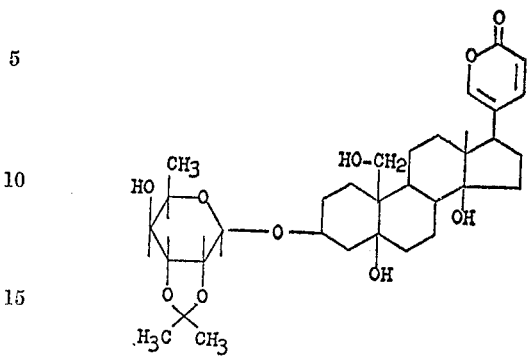

Example 9.—Preparation of 3β-(2′,3′-isopropylidene-4′-acetyl) - L - rhamnosido - 5β,14β,19 - trihydroxy-bufa-20,22-dienolide by method B A solution of 0.5 gm. of desglucohellebrin acetonide monoacetate in 10 cc. of dry tetrahydrofuran was admixed with 17 cc. of a reducing solution consisting essentially of lithium-tri-tert.butoxy-aluminum hydride dissolved in tetrahydrofuran, and the mixed solution was allowed to stand for 45 minutes at 0° C. Thereafter, 16 cc. of aqueous 5% acetic acid were added and the reaction solution was extracted with chloroform. The extract solution was washed first with an aqueous saturated solution of sodium bicarbonate and then with water, dried over sodium sulfate and evaporated in vacuo. The residue was recrystallized from a mixture of acetone and hexane. 0.37 gm. (74% of theory) of a substance having a melting point of 150–159° C. was obtained. It was identified to be 3β-(2′,3′-isopropylidene-4′ - acetyl) - L - rhamnosido - 5β,14β,19 - trihydroxy-bufa-20,20-dienolide.

Example 10.—Preparation of 3β-(2′,3′-isopropylidene-4′-acetyl)-L-rhamnosido-5β,14β,19-trihydroxy-bufa- 20,22-dienolide by method C 78 mgm. of desglucohellebrol acetonide were dissolved in 0.04 cc. of pyridine, the solution was admixed with 0.013 cc. of acetic acid anhydride, and the mixture was allowed to stand for 48 hours at 0° C. Thereafter, the reaction solution was evaporated to dryness, and the residue was taken up in chloroform. The thin-layer-chromatogram of a sample of the chloroform solution indicated that it contained about equal parts of reaction product and starting compound. Separation was effected by means of a silicagel column (4 gm.; 0.2–0.5 mm.) with methylene chloride/acetone and methylene chloride/methanol mixtures. 19 gm. (22.8% of theory) of a substance having a melting point of 156–160° C. were obtained. It was identified to be 3β-(2′,3′-iso-propylidene-4′-aceytl)-L-rhamnosido-5β, 14β,19-trihydroxy - bufa-20,22-dienolide.

Mixed melting point determination with the compound obtained in Example 9 showed no depression.

Mixed thin-layer-chromatogram determination with the compound obtained in Example 9 showed uniform products.

Example 11.—Preparation of 3β-(2′,3′-n-propylidene)-L-rhamnosido-5β, 14β, 19-trihydroxy-bufa-20,22-dienolide by method B 100 mgm. of 3β-(2′,3′-n-propylidene)-L-rhamnosido-5β,14β-dihydroxy-19-oxo-bufa - 20,22-dienolide were dissolved in 5 cc. of dry tetrahydrofuran, the solution was admixed with a reducing solution consisting essentially of lithium-tri-tert.butoxy-aluminum hydride dissolved in tetrahydro furan, and the mixed solution was shaken for 30 minutes at 0° C. A thin-layer chromatogram of a sample of the reaction solution indicated that the reaction had gone to completion. The reaction solution was worked up as described in Example 1. After recrystallization of the raw reaction product from a mixture of ether and hexane, 48 mgm. (47.5% of theory), of a white granular substance, M.P. 148–152° C., were obtained. It was identified to be 3β-(2′,3′-n-propylidene)-L-rhamnosido-5β,14β,19-trihydroxy-bufa-20,22-dienolide.

The compounds according to the present invention, that is, those embraced by Formula I above, have useful pharmacodynamic properties. More particularly, the compounds of the invention exhibit cardiac activities similar to those of other cardiac-active glucoside principles in warm-blooded animals. Specifically, they produce a positive inotropic effect in the isolated guinea pig auricle which significantly exceeds that of g-strophanthin, while their toxicity is substantially smaller than that of g-strophanthin.

For pharmaceutical purposes the compounds of the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, solutions, suspensions, emulsions, syrups, capsules, wafers, suppositories and the like. One dosage unit of the compounds of the invention is from 0.0028 mgm./kg. body weight to 0.033 mgm./kg. body weight.

The following examples illustrate a few dosage unit compositions comprising a compound of the invention as an active ingredient. The parts are parts by weight unless otherwise specified.

Example 12.—Tablets

The tablet composition is compounded from the following ingredients:

|  | Parts |
|---|---|
| 3β-(2′,3′-isopropylidene) - L-rhamnosido-5β,14β, 19-trihydroxy-bufa-20,22-dienolide | 0.25 |
| Lactose | 85.75 |
| Potato starch | 30.00 |
| Gelatin | 3.00 |
| Magnesium stearate | 1.00 |
| Total | 120.00 |

Compounding procedure.—The steroid glycoside is intimately ground with ten times its weight of lactose, and the ground mixture is admixed with the remainder of the lactose as well as with the potato starch. The resulting mixture is granulated by moistening it with an aqueous 10% solution of the gelatin and forcing the moist mass through a 1.5 mm.-mesh screen. The granulate was dried at 40° C., again passed through a 1 mm.-mesh screen, and admixed with the magnesium stearate. The finished composition is pressed into 120 mgm.-tablets, each of which contains 0.25 mgm. of the steroid glycoside.

Example 13.—Coated pills

The pill core composition is compounded from the following ingredients:

|  | Parts |
|---|---|
| 3β-(2′,3′-isopropylidene)-L- rhamnosido - 5β,14β dihydroxy-bufa-20,22-dienolide | 0.25 |
| Lactose | 32.25 |
| Corn starch | 15.00 |
| Polyvinylpyrrolidone | 2.00 |
| Magnesium stearate | 0.50 |
| Total | 50.00 |

Compounding procedure.—The steroid glycoside is intimately ground with ten times its weight of lactose, the ground mixture is admixed with the remainder of the lactose as well as with the corn starch, and the mixture is granulated by moistening it with an aqueous 15% solution of the polyvinvylpyrrolidone and forcing the moist mass through a 1 mm.-mesh screen. The granulate is dried at 40° C., again passed through the screen, and admixed with the magnesium stearate. The finished composition is pressed into 50 mgm.-pill cores, which are subsequently coated with a thin shell consisting essentially of talcum and sugar, and polished with beeswax. Each pills weighs approximately 85 mgm. and contains 0.25 mgm. of the steroid glycoside.

Example 14.—Drop solution

The solution is compounded from the following ingredients:

|  | Parts |
|---|---|
| 3β-(2′,3′-isopropylidene) - L-rhamnosido-5β,14β-dihydroxy-19-oxo-bufa-20,22-dienolide | 0.0125 |
| Saccharin sodium | 0.3 |
| Sorbic acid | 0.1 |
| Ethanol | 30.0 |
| Flavoring | 1.0 |
| Distilled water, q.s. ad | 100.0 |

Compounding procedure.—The steroid glycoside and the flavoring are dissolved in the ethanol (solution A). The sorbic acid and the saccharin are dissolved in the distilled water (solution B). Solution A is admixed with solution B, and the mixed solution is filtered until free from suspended matter. 1 cc. of the solution contains 0.125 mgm. of the steroid glycoside.

Example 15.—Hypodermic solution

The solution is compounded from the following ingredients:

|  | Parts |
|---|---|
| 3β - (2′,3′ - isopropylidene - 4′ - acetyl) - L-rhamnosido - 5β,14β,19 - trihydroxy - bufa - 20, 22-dienolide | 0.25 |
| Polyethyleneglycol 600 | 150.0 |
| Tartaric acid | 5.0 |
| Distilled water, q.s. ad 3000.0 parts by vol. | |

Compounding procedure.—The tartaric acid, the polyethyleneglycol and the steroid glycoside are successively dissolved in distilled water, the solution is diluted with additional distilled water to the desired volume, and the finished solution is filtered until free from suspended matter. The filtrate is filled into white 3 cc.-ampules in an atmosphere of nitrogen, and the filled ampules are sterilized for 20 minutes at 120° C. and then sealed. Each ampule contains 0.25 mgm. of the steroid glycoside.

Example 16.—Suppositories

The suppository composition is compounded from the following ingredients:

|  | Parts |
|---|---|
| 3β - (2′,3′ - isopropylidene - 4′ - acetyl) - L-rhamnosido - 5β,14β - dihydroxy - 19 - oxo-bufa-20,22-dienolide | 0.25 |
| Lactose | 4.75 |
| Cocoa butter | 1695.00 |
| Total | 1700.00 |

Compounding procedure.—The steroid glycoside is intimately admixed with the lactose by grinding, and the ground mixture is stirred with the aid of an immersion homogenizer into the cocoa butter which had previously been melted and cooled to 40° C. The composition is cooled to 37° C. and is poured into cooled suppository molds, each holding 1.7 gm. of the composition. Each suppository contains 0.25 mgm. of the steroid glycoside.

Although the above dosage unit composition examples illustrate only four specific compounds of the present invention as active ingredients, it should be understood that any of the other compounds embraced by Formula I may be substituted for the active ingredients in Examples 12 through 16. Moreover, the amount of active ingredient in these examples may be varied within the dosage unit range set forth above, and the amounts and nature of the inert pharmaceutical carrier components may be varied to meet particular requirements.

While the present invention has been illustrated with the aid of certain specific embodiments, it will be readily apparent to others skilled in the art that the invention is not limited to these embodiments and that various changes and modifications may be made without departing from the spirit of the invention or the scope of the appended claims.

We claim:
1. A compound of the formula:

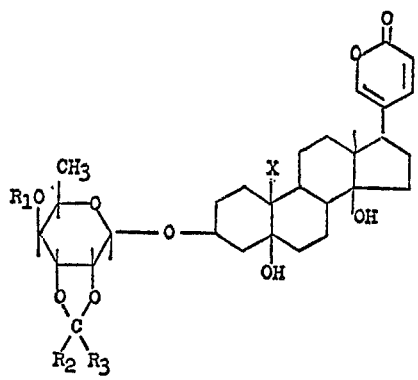

wherein:
$R_1$ is hydrogen or acetyl,
$R_2$ and $R_3$ are each hydrogen, alkyl of 1 to 3 carbon atoms or chloroalkyl of 1 to 3 carbon atoms, or, together with each other and the carbon atom to which they are attached, form the cyclohexyl ring, and
X is formyl or hydroxymethyl.

2. A compound according to claim 1, wherein $R_1$ is hydrogen, $R_2$ and $R_3$ are methyl, and X is formyl.
3. A compound according to claim 1, wherein $R_1$ is hydrogen, $R_2$ and $R_3$ are methyl, and X is hydroxymethyl.
4. A compound according to claim 1, wherein $R_1$ is acetyl, $R_2$ and $R_3$ are methyl, and X is formyl.
5. A compound according to claim 1, wherein $R_1$ is acetyl, $R_2$ and $R_3$ are methyl, and X is hydroxymethyl.
6. A compound according to claim 1, wherein $R_1$ and $R_2$ are hydrogen, $R_3$ is ethyl, and X is formyl.
7. A compound according to claim 1, wherein $R_1$ and $R_2$ are hydrogen, $R_3$ is ethyl, and X is hydroxymethyl.
8. A compound according to claim 1, wherein $R_1$ is acetyl, $R_2$ is hydrogen, $R_3$ is ethyl, and X is formyl.

References Cited
UNITED STATES PATENTS 3,177,200   4/1965   Meyer   260—210.5
3,223,587   12/1965   Wilkinson   260—210.5

LEWIS GOTTS, Primary Examiner
JOHNNIE R. BROWN, Assistant Examiner

U.S. Cl. X.R.
424—182